Sept. 18, 1934.  H. C. CARTER  1,974,133
HOPPER UNIT FOR UNDERFEED STOKERS
Filed Nov. 25, 1932
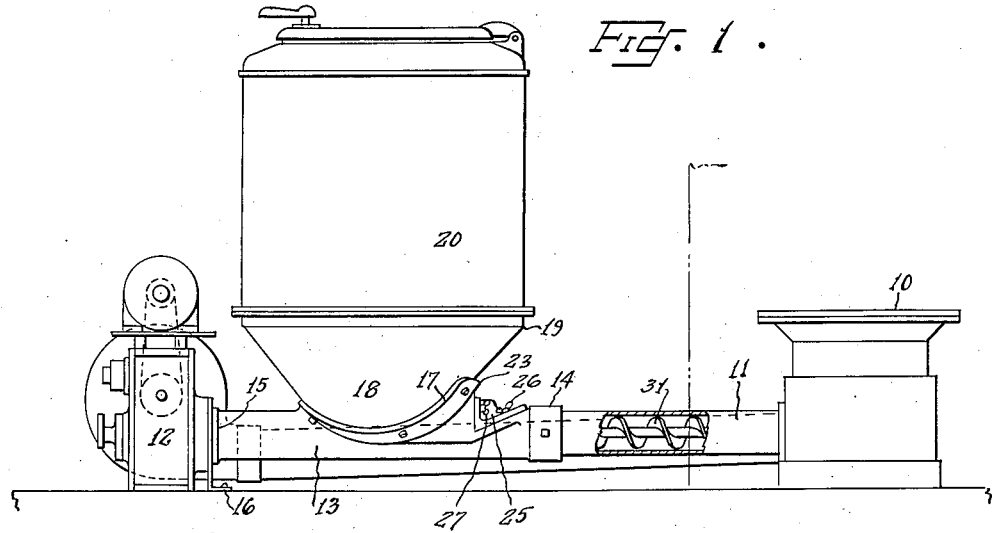
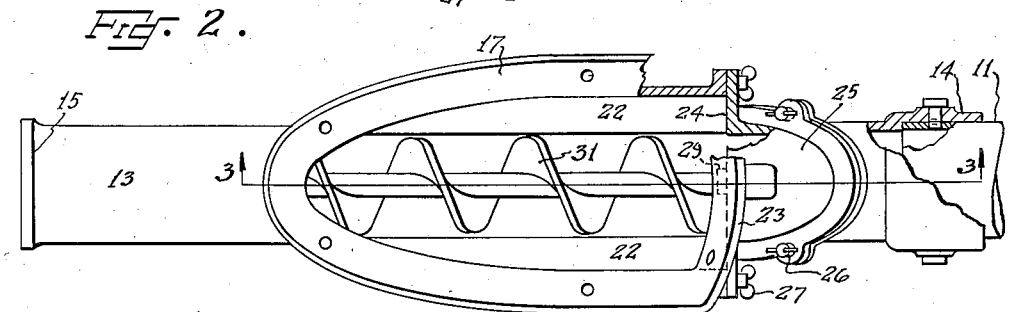
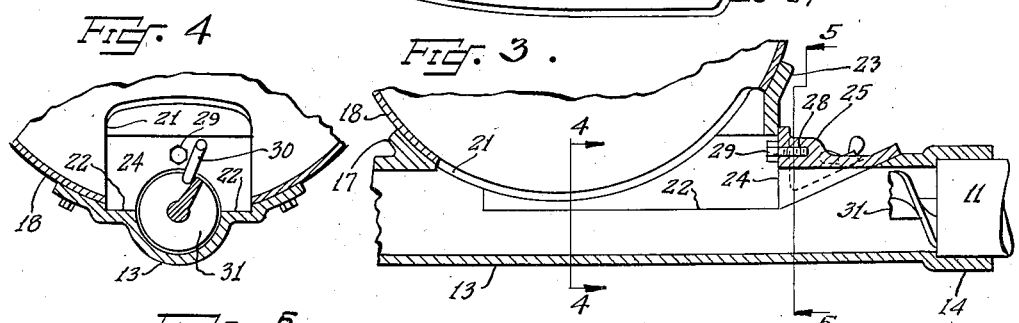
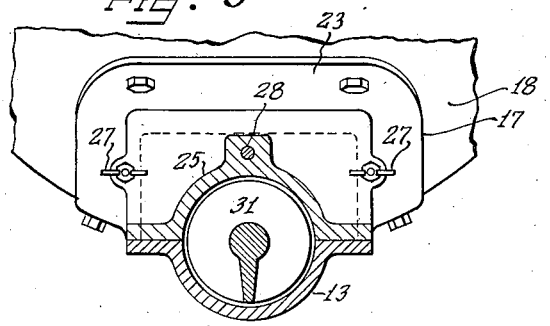
INVENTOR
H. C. CARTER
ATTORNEY Patented Sept. 18, 1934

1,974,133

UNITED STATES PATENT OFFICE 1,974,133

HOPPER UNIT FOR UNDERFEED STOKERS

Haskell C. Carter, Portland, Oreg., assignor to Iron Fireman Manufacturing Company, Portland, Oreg.

Application November 25, 1932, Serial No. 644,316

6 Claims. (Cl. 198—64)

This invention relates generally to underfeed stokers, and particularly to a hopper base therefor.

The main object of this invention is to provide a new form of hopper base providing the maximum amount of support for the lower half of the feed worm, and at the same time providing flat, lateral ledges along which foreign obstructions can slide in a horizontal direction to the point of clean-out.

The second object is to provide a construction which will permit the use of a cast metal worm housing where the greatest strength and durability is required, and a light-weight, pressed metal hopper base in a locality where there is little wear and where the part is subjected to no greater stress than that which is required to sustain the coal in the hopper.

The third object is to so form both the hopper base and worm housing as to expedite the feeding of the fuel from the hopper base and to limit the portion of the worm which is exposed to the weight of the coal in the hopper, thereby economizing in power and resulting in a more uniform feeding of the fuel with varying heights of coal in the hopper.

The fourth object is to so construct the worm housing of materials best suited to resist the errosive conditions which are worse at the point where the worm duct is located.

The fifth object is to provide an improved form of clean-out door through which it is possible to remove obstructions at their point of lodgement.

These, and other objects, will become more apparent from the specification following as illustrated in the accompanying drawing, in which:

Fig. 1 is a side elevation of a stoker of which the unit is a part, showing a portion of the fuel feed screw in section.

Fig. 2 is a plan of the worm housing with portions in section.

Fig. 3 is a vertical section taken along the line 3—3 in Fig. 2.

Fig. 4 is a section taken along the line 4—4 in Fig. 3.

Fig. 5 is a section taken along the line 5—5 in Fig. 3.

Similar numbers of reference refer to the same or similar parts throughout the several views.

Referring in detail to the drawing, there is shown a retort 10 and a fuel feed duct 11 between which and the transmission 12 is placed the tubular worm housing 13, whose bell end 14 receives the duct 11 and whose end 15 is supported by the legs 16 and secured to the transmission 12. On the top side of the worm housing 13 is formed a saddle 17 adapted to receive the spherical bottom 18 of the hopper base 19 upon which sets the hopper 20 which may be of any desired shape. The bottom 18 is provided with a slot 21 through which coal can enter the worm housing 13. Along the horizontal center line of the housing 13 and inside of the saddle 17 are formed the flat, horizontal ledges 22. These ledges extend under the back 23 of the saddle 17 to the face 24 of the wedge-shaped clean-out gate 25 which is held in position by the wing nuts 26 and 27. In the gate 25 is mounted a screw 28 whose head 29 projects beyond the face 24 and is used as a stop for the foreign substance 30.

The hopper base 19 is secured to the saddle 17 in any convenient manner, but it is desirable that this joint should be dust and air tight.

The operation of the device is as follows: Assuming that a supply of coal is placed in the hopper 20 and that it passes gradually through the slot 21 into the fuel feed worm 31 by means of which it is carried toward the duct 11. It will first be seen that owing to the relatively small size of the slot 21, that the worm 31 is subjected to only a portion of the weight of the coal above same, and that this coal will feed down in a fairly uniform manner, especially when assisted by means of an agitator such as is described in Patent Number 1,812,911.

Now assuming that a piece of metal has found its way into the coal supply: If this does not lodge between the worm flights, it will be carried along either of the ledges 22 against the face 24, and if it does not then pass between the flights, it will be carried up against the head 29 of the screw 28, thereby overloading the stoker and causing a stoppage thereof through the operation of its protective devices with which such apparatus is ordinarily equipped. The attendant, then, has merely to remove the wing nuts 26 and 27 and then lift the gate 25 out of the way, exposing the foreign substance to view and making same readily accessible without the removal of an objectionable amount of coal.

It will be noted that by providing a somewhat restricted opening for the entrance of coal into the feed worm there is less of a tendency to build up a backing action in the fuel feed duct. Also by providing the horizontal shells 22 on each side of the fuel feed worm at the point at which it receives fuel from the hopper it is impossible to obtain the wedging action, which is the main cause of failures in fuel feed mechanisms of this type, due to the fact that foreign substances wedge between the downwardly turning sides of the fuel feed worm and the sloping side of the worm housing.

Although the details thereof are not shown herein it will be understood that it is desirable to provide some form of agitator to insure a constant supply of fuel passing through said restricted opening leading to the feed worm, and I prefer to use the type of agitator described in United States Patent No. 1,812,911.

I claim:

1. A stoker having in combination a tubular worm housing, a spherical hopper base disposed above said housing and communicating therewith, a clean-out gate on the top side of said housing on the under side of said base, and horizontal ledges along each side of said housing whereby foreign substances may be made to slide toward the clean-out opening.

2. A hopper unit comprising a cast metal tubular worm housing having a saddle formed on the top side thereof, a spherical hopper base seated in said saddle and communicating with the interior of said housing, a wedge shaped clean-out gate at the outlet of said saddle, and a fuel feed screw within said housing for carrying fuel from said hopper base past said clean-out gate.

3. An underfeed stoker having a worm housing provided with a V-shaped clean-out door on its top side near its discharge end, the side of said door facing the intake end having a stop thereon, and a feed worm within said housing for moving materials from the middle portion of said housing past said clean-out door.

4. The substance of claim 3, and flat ledges disposed on opposite sides of said housing extending from the middle portion of said housing to said clean-out door, together with a hopper base communicating with the interior of said housing near the middle of the top side thereof.

5. An underfeed stoker comprising a worm, a worm housing provided with longitudinally and transversely horizontal lateral ledges along a portion of the length of the housing at approximately the middle of the vertical diameter of the worm, and a clean-out door for permitting the removal of obstructions from the furthermost end of said ledges in the direction in which fuel is moved by said worm.

6. An underfeed stoker comprising a worm housing containing a horizontal helical fuel feed worm, said housing having a radially extending and substantially horizontal ledge disposed along the downwardly turning side of the worm approximately at the middle of the vertical diameter of the worm, and a clean-out door in said housing from which obstructions can be removed after they have traveled to one end of said ledge.

HASKELL C. CARTER.